US012350928B2

(12) United States Patent
Heath

(10) Patent No.: US 12,350,928 B2
(45) Date of Patent: Jul. 8, 2025

(54) FLATBED PRINTER WITH INTEGRATED CREASING AND CUTTING

(71) Applicant: Electronics for Imaging, Inc., Fremont, CA (US)

(72) Inventor: Peter Heath, Alexandria, NH (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 95 days.

(21) Appl. No.: 18/154,738

(22) Filed: Jan. 13, 2023

(65) Prior Publication Data

US 2024/0239117 A1 Jul. 18, 2024

(51) Int. Cl.
*B41J 11/70* (2006.01)
*B41J 11/00* (2006.01)

(52) U.S. Cl.
CPC ............ *B41J 11/70* (2013.01); *B41J 11/0045* (2013.01)

(58) Field of Classification Search
CPC ............................... B41J 11/70; B41J 11/0045
See application file for complete search history.

(56) References Cited

U.S. PATENT DOCUMENTS

| | | | |
|---|---|---|---|
| 2,687,795 | A | 8/1954 | Wise |
| 2004/0085422 | A1 | 5/2004 | Kelley |
| 2005/0158107 | A1 | 7/2005 | Acher |
| 2013/0286122 | A1 | 10/2013 | Norasak et al. |
| 2015/0231724 | A1 | 8/2015 | Williams |
| 2017/0106475 | A1 | 4/2017 | Mikkelsen et al. |
| 2017/0368708 | A1 | 12/2017 | Kelly et al. |
| 2019/0061384 | A1 | 2/2019 | Barrett |
| 2021/0001504 | A1 | 1/2021 | Wade |

FOREIGN PATENT DOCUMENTS

| | | | |
|---|---|---|---|
| EP | 0189909 | A2 | 8/1986 |
| GB | 2294656 | A | 5/1996 |

OTHER PUBLICATIONS

Cutting systems; retrieved online on Jan. 11, 2023 from url: https://www.zund.com/en, 3 pages.
Inline Finishing System—a world leader in digital finishing; retrieved online on Jan. 11, 2023 from url: https://www.ifinishingsystem.com/ , 4 pages.
Plockmatic Group, Morana AutoCut Pro, date unknown, 4 pages.
SmartSlitter by Horizon; Sheet Cutter and Creaser SMSL-100, date unknown, 8 pages.
"Digital cutters for every application", Kongsberg Precision Cutting Systems, retrieved online on Jan. 11, 2023 at url: https://www.kongsbergsystemscom/en, 7 pages.
"Digital finising systems with Roll to roll and sheet cutting modes", retrieved online on Jan. 11, 2023 from url: https://www.digitalfinishingsystems.com/, 7 pages.

*Primary Examiner* — Lisa Solomon
(74) *Attorney, Agent, or Firm* — Perkins Coie LLP

(57) ABSTRACT

Embodiments of the invention add a cutting tool and a creasing wheel to a flatbed printer. This reduces workflow steps, allows cutting and creasing without having to re-register image/media, and reduces required floor space for small shops.

22 Claims, 15 Drawing Sheets

FIGURE 9 – PRIOR ART

FLATBED PRINTER WITH INTEGRATED CREASING AND CUTTING

FIELD

Various of the disclosed embodiments concern a flatbed printer with integrated creasing and cutting.

BACKGROUND

State-of-the-art printers may use a post-process media cutting machine, such as an analog die cutting machine or a dedicated digital cutter, to cut media into a desired configuration, such as a flat cardboard box, after it is printed. Media cutting systems are offered by such manufacturers as Kongsberg Precision Cutting Systems and Zünd Systemtechnik AG.

State-of-the-art printers may also use in-line media folding/creasing machines. Media folding/creasing machines are offered by manufacturers such as Horizon, Inc. and Morgana Systems.

Machines are also known for both cutting and creasing media. Such machines are manufactured by, for example, Inline Finishing System/Digital Finishing Group.

All such cutting and creasing operations are currently performed with a separate machine after the media is printed. Moving the printed media from the printer to such cutting and creasing machines creates registration problems that reduce the quality of the finished product. Such cutting and creasing machines also slow media processing due to processing delays that result from the additional steps of transferring the media from the printer to the cutting and/or creasing and registration before further processing may proceed. Further, such machines are large and therefore take up considerable space in a media production facility.

SUMMARY

Embodiments of the invention make it possible to dispense with such secondary processing machines as cutting and creasing machines by adding a cutting tool and a creasing wheel to a flatbed printer. This allows printing and finishing in one operation. This reduces workflow steps, allows cutting and creasing without having to re-register image/media, and reduces required floor space for small shops. Laser

DETAILED DESCRIPTION

Figure 1:
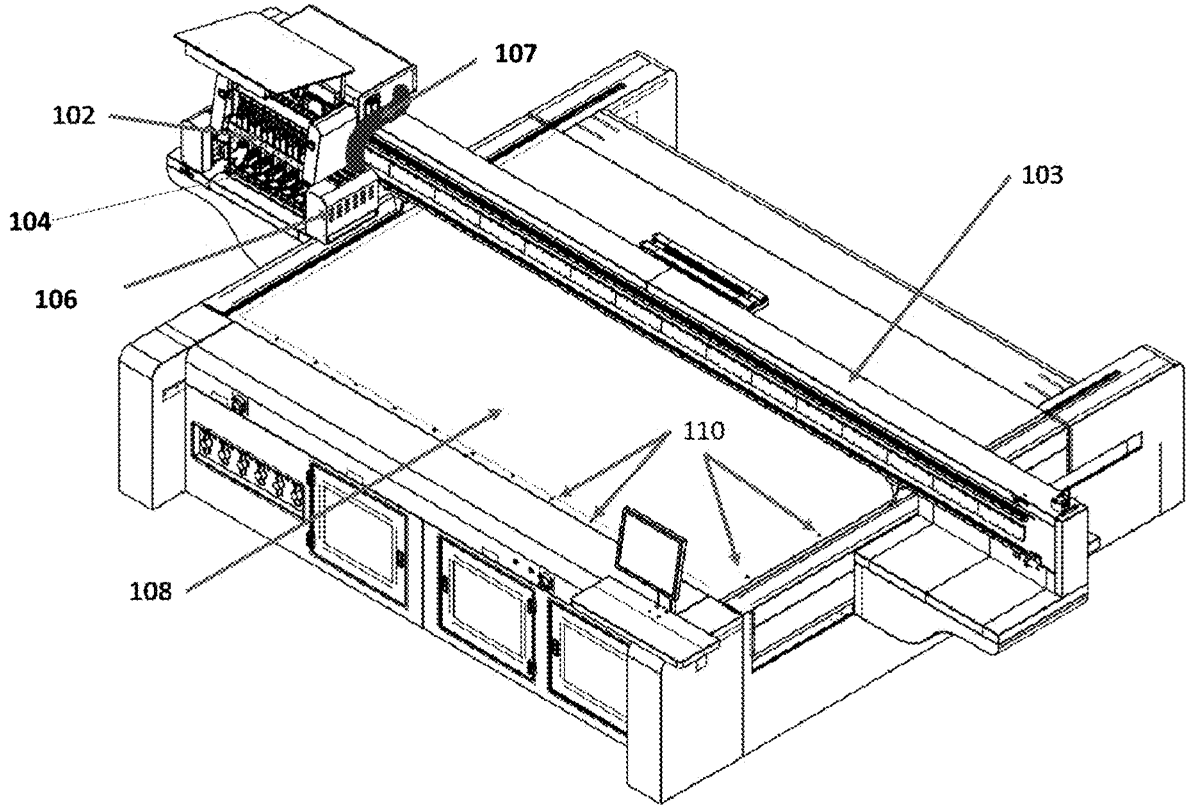
FIG. 1 is a perspective view of a flatbed printer with integrated creasing and cutting according to an embodiment of the invention.

FIG. 1 is a perspective view of a flatbed printer with integrated creasing and cutting according to an embodiment of the invention. In FIG. 1, a printer 100 includes a carriage 102 and gantry 103 that effect coordinated X-Y movement of a print head assembly 104 and UV cure lamps within the side covers of the laser 106 across a print bed 108 to process a print medium (not shown). The print medium is placed on the print bed and aligned with pins 110 on the print bed to effect registration of the medium to the head assembly and assure accurate printing. In other embodiments of the invention, registration may be effected by placing an alignment bar at one or more edges of the print bed, by the use of an imaging system to capture the location of the medium on the print bed and adjust travel of the gantry and carriage accordingly, or a vacuum assisted holding mechanism.

Embodiments of the invention add a cutting laser 106 and creasing wheel to the flatbed-style printer, thus making it possible to dispense with such secondary processing machines as cutting and creasing machines. In embodiments of the invention, the cutting laser is a diode laser module. Embodiments of the invention may include both a cutting device and a creasing device in the printer or they may include either of a cutting device or a creasing device in the printer.

In embodiments, the laser is used for simple shape cutting and the creasing wheel adds creases to the medium for folding. This reduces workflow steps, allows cutting and creasing without having to re-register image/media, and, because additional machines are not required for post processing, reduces required floor space in the production facility. An exhaust 107 is provided to draw fumes away from the printer that result when the laser cuts the medium.

Figure 2:
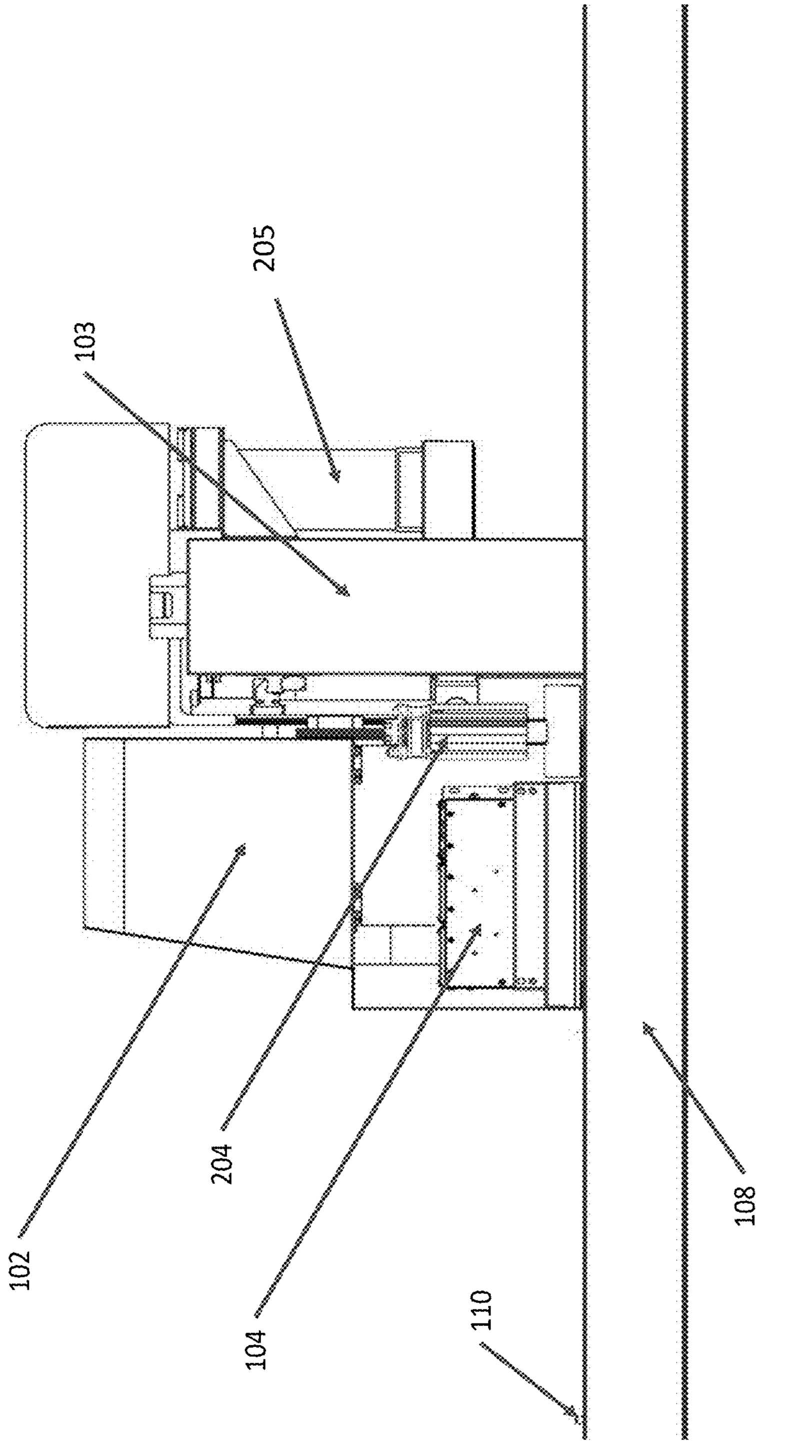
FIG. 2 is a side view of the flatbed printer of FIG. 1 according to an embodiment of the invention.

FIG. 2 is a side view of the flatbed printer of FIG. 1 according to an embodiment of the invention. Embodiments of the invention make it possible to dispense with such secondary processing machines as cutting and creasing machines. In FIG. 2, in addition to a complement of print heads, the head assembly 104 includes a cutting tool 204 and a creasing wheel. An umbilical cable 205 connects the components of the print head and cutting tool to the printer for power and data transfer. Embodiments of the invention allow the printer to cut and crease in place. In a typical printer, cutting speeds are about 4 ips but can be varied based upon the application. For example, thinner materials may be cut at faster speeds, etc. Creasing speeds are about 54/20 ips at 0.5 g acceleration but can be varied based upon the application. For example, different creases and materials may require more or less pressure and/or faster or slower speeds.

Embodiments of the invention cut and crease straight lines and at various angles such as 45° angles. Other embodiments may cut complex shapes. Further, complex creases may be made depending upon the crease tool used. Both the cutting parameters, e.g. laser power level and shapes and the creasing parameters, e.g. pressure and speed, can be set in a user dashboard dialog when setting the print parameters.

Figure 3:
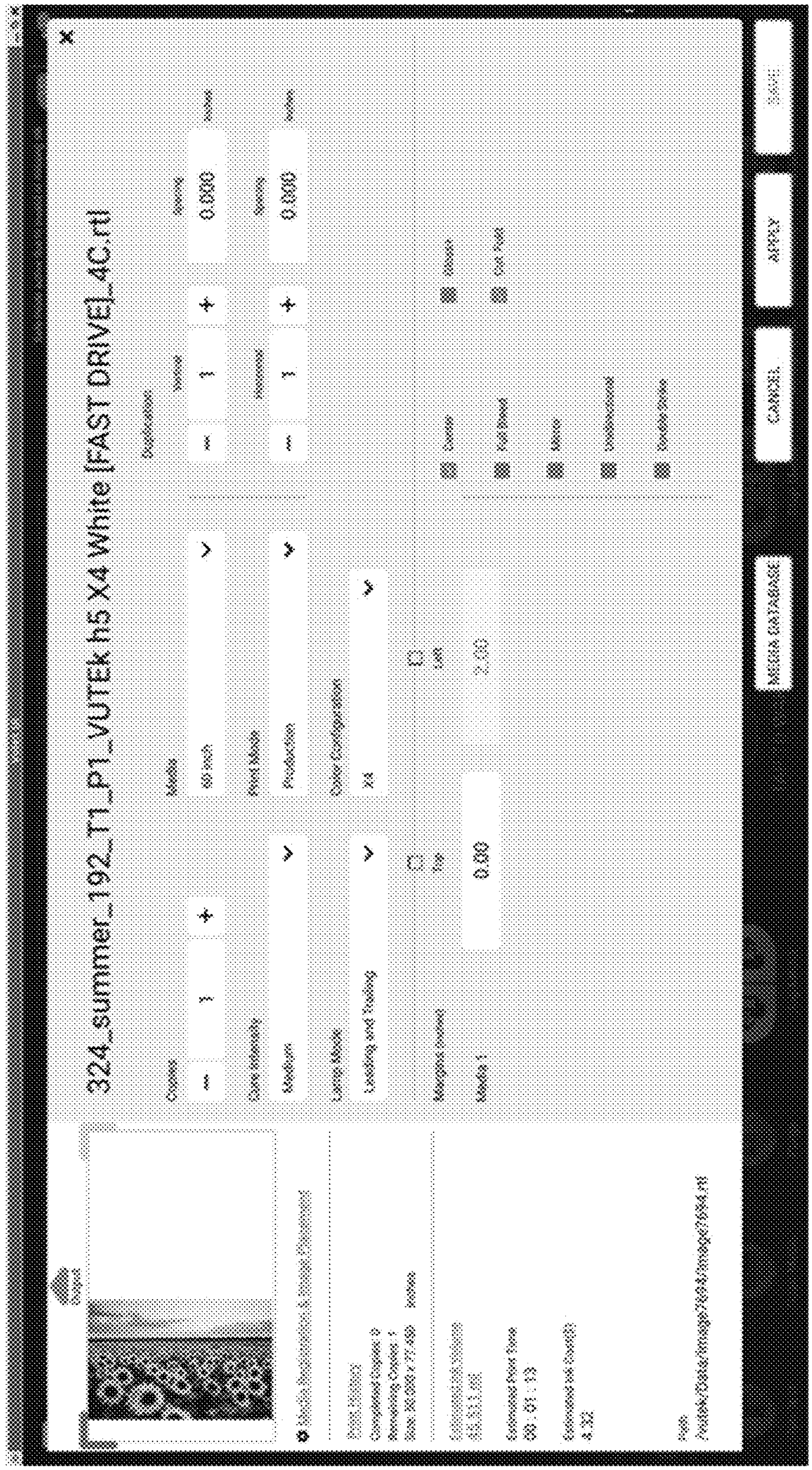
FIG. 3 shows a user dashboard dialog for setting a print parameters including access to a media database according to an embodiment of the invention.
Figure 4:
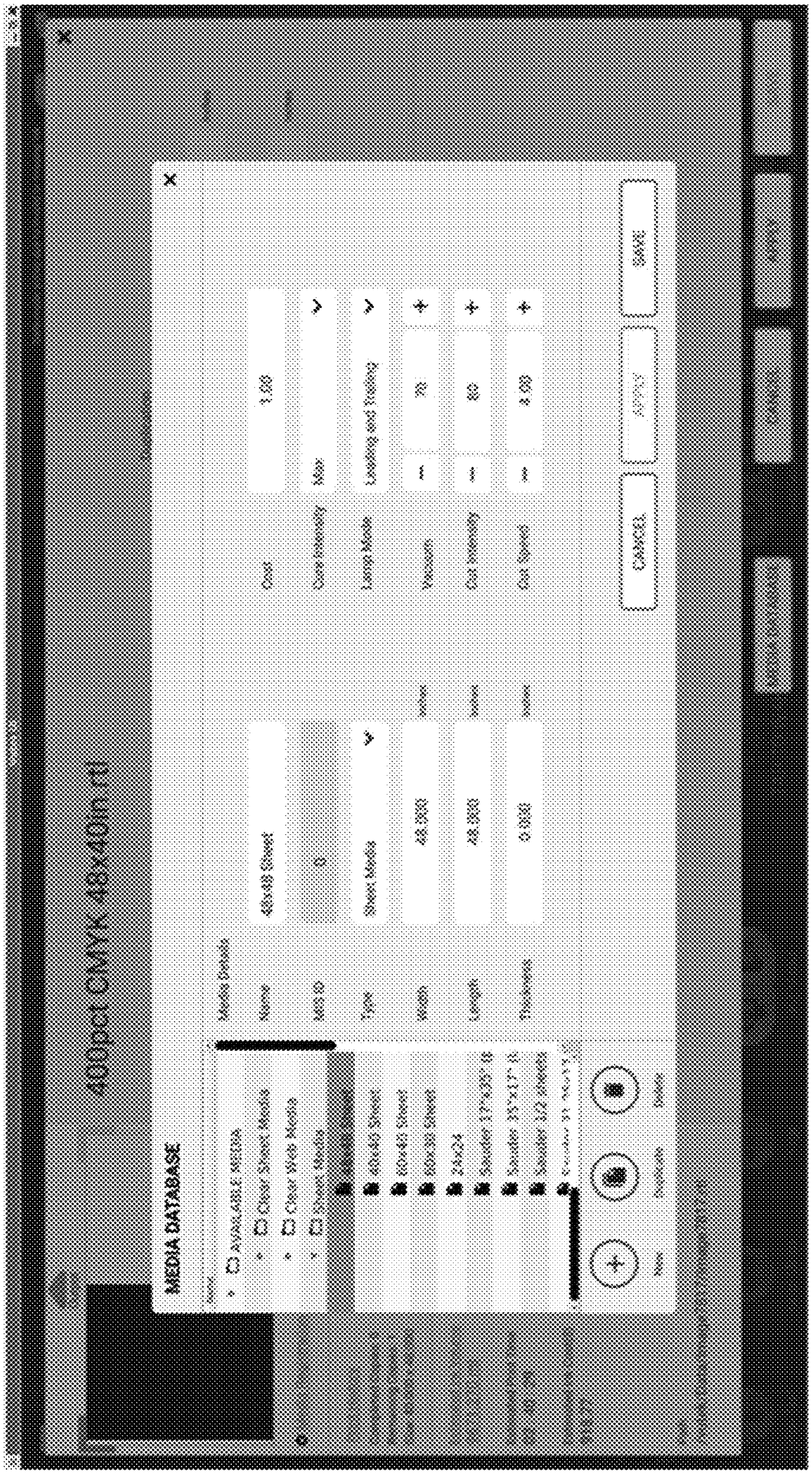
FIG. 4 shows a user dashboard dialog for setting a print parameters within the media database of FIG. 3 according to an embodiment of the invention.

FIG. 3 shows a user dashboard dialog for setting a print parameters including access to a media database according to an embodiment of the invention; and FIG. 4 shows a user dashboard dialog for setting a print parameters within the media database of FIG. 3 according to an embodiment of the invention. In this embodiment of the invention, the crease pressure is set via a pneumatic regulator on the printer's pneumatics panel. The pressure is typically set once when the crease wheel type is changed. The UI enables the cut function (Cut Fold on FIG. 3). The laser cut intensity and cut speed are media dependent and configured in the printer's media database (see FIG. 4). An embodiment uses a fixed cut speed with a manual laser intensity and regulator, i.e. two physical knobs on the printer.

In embodiments of the invention, the shape of the medium after printing can be set at the same time that printing parameters and image information is entered into a printer controller. The path (crease and cut) is drawn in Adobe Illustrator, Adobe Photoshop, or a similar application. An EFI Fiery XF, the RIP (raster image processor), converts the PDF files to printable raster images with embedded cut/crease instructions.

Upon completion of printing, the gantry and carriage are operated to make cuts and creases based on embedded instructions for a current image. The image can be creased and cut immediately because the print table always has full registration of the media. This reduces workflow steps, allows cutting and creasing without having to re-register image/media, and reduces required floor space in production facilities.

Figure 5:
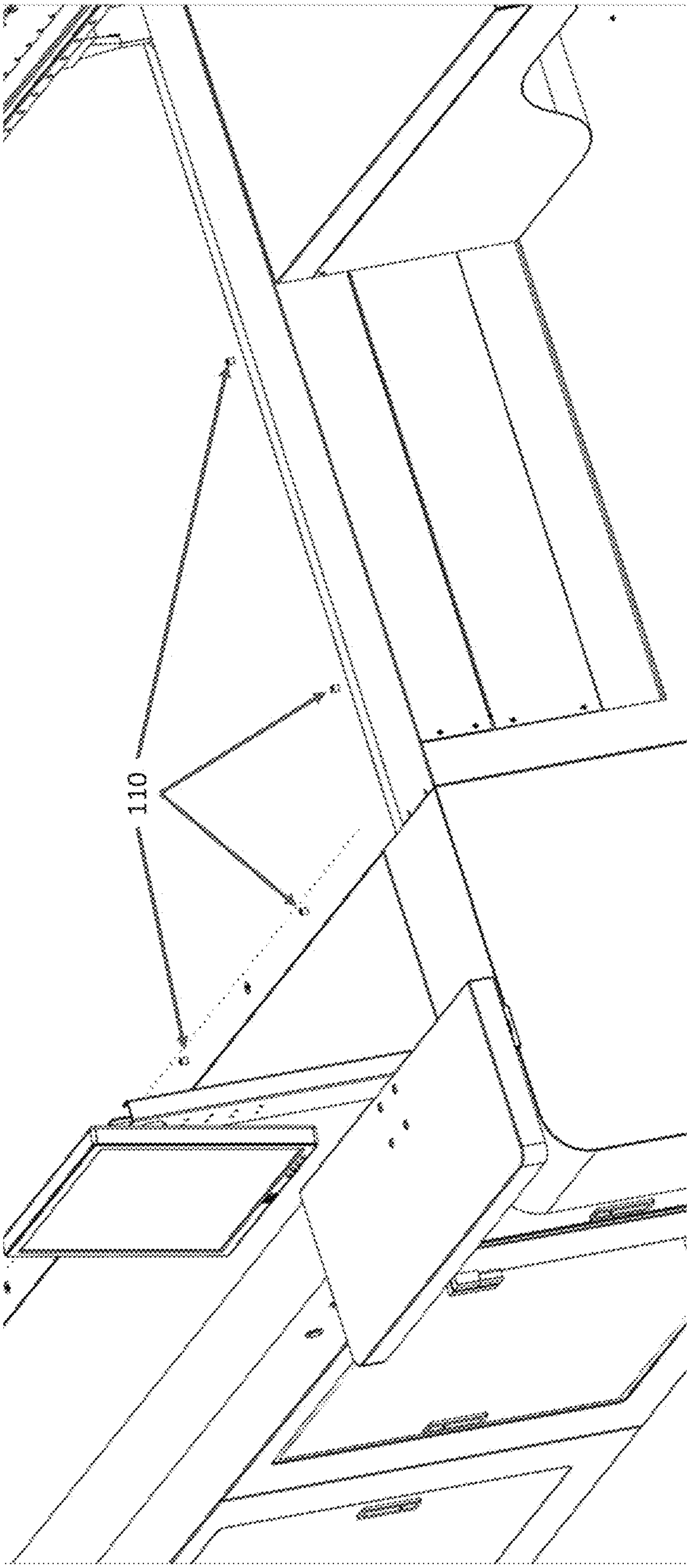
FIG. 5 is a plan view of a printer that shows media alignment pins according to an embodiment of the invention.

FIG. 5 is a plan view of a printer that shows media alignment pins 110 according to an embodiment of the invention. In embodiments of the invention alignment bars may be used to effect registration of the medium.

Figure 6:
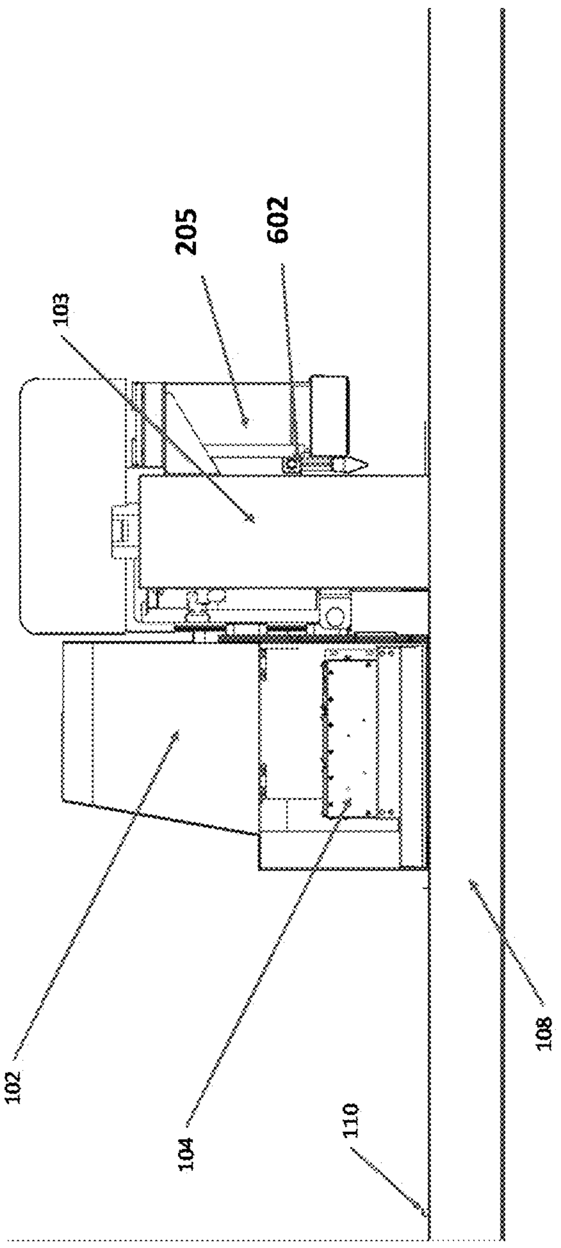
FIG. 6 is a side view of a printer that shows a UV LED cover hidden with a CO2 laser head at a rear of a printer carriage.

FIG. 6 is a side view of a printer that shows a UV LED cover hidden with a CO2 laser head 602 at a rear of a printer carriage. FIG. 4 shows a CO2 laser head mirror and lens assembly 402. In this embodiment of the invention, the CO2 laser offers more cutting power, which in turn allows faster cuts, but has drawbacks. It is a large glass tube that requires liquid cooling (water circulation). The beam is also invisible which can make working with is difficult.

Figure 7:
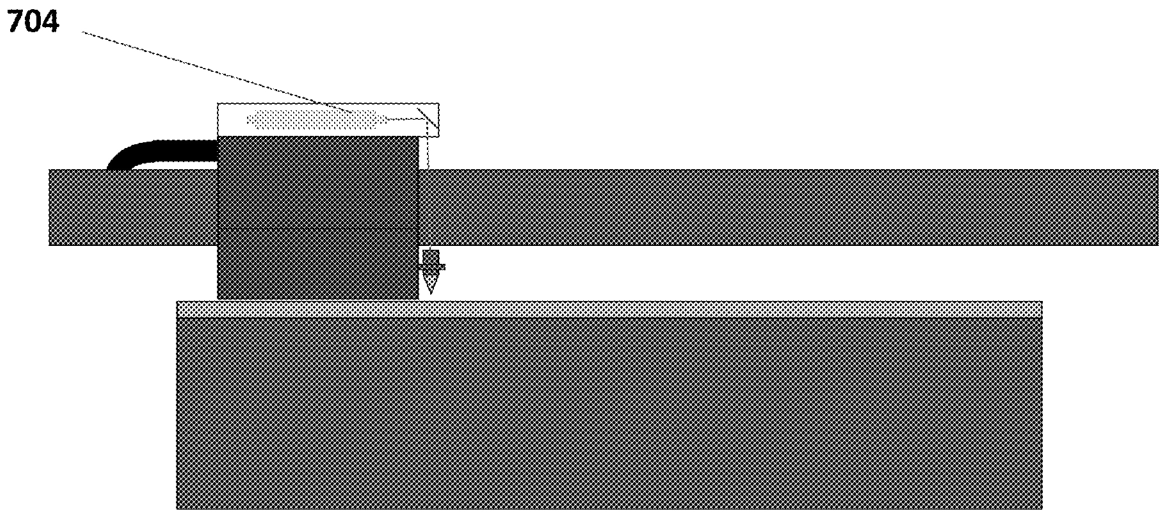
FIG. 7 is a side view of a printer that shows a CO2 laser on a printer carriage according to an embodiment of the invention.

FIG. 7 is a side view of a printer that shows a CO2 laser 704 on a printer carriage according to an embodiment of the invention. Alternative embodiments of the invention use a diode laser that is of sufficient power to cut target materials, but insufficient to cut the metal (aluminum) print table. Target media can include any of paper, cardstock, corrugated materials, cardboard, PSA/films, textiles, acrylic, expanded PVC, wood, polystyrene, etc. Multiple passes of laser can be used to cut some materials, for example corrugated plastic (Coroplast) which has an internal structure and a heat sensitive surface. Coordinated axis motion of the carriage and gantry allows cutting of curves and circles. A CO2 laser is a larger class laser tube that provides more power than a diode laser module. It requires liquid cooling and is in general more difficult to use (more complicated power supply, etc.). The laser diode is a solid-state (similar to an LED) that is self-contained and easy to use and is relatively easier to use than a CO2 laser. Both lasers have insufficient power to cut the print table.

In embodiments of the invention, laser power output is adjustable in an analog fashion (0-100%). This allows cutting power to be set for the medium being cut. A laser power adjustment signal may be provided to the printer with the imaging, cutting, and creasing instructions or it may be set independently.

The laser assembly may include a flame detector for verification of no flame when the laser is stopped. The gantry may contain an extraction mechanism for removing cutting fumes. In embodiments of the invention the laser assembly contains a full air extraction of fan and filter.

In embodiments of the invention, the laser cutting head may be also replaced by a knife or other bladed instrument.

In embodiments of the invention, a CNC style router spindle can replace the laser cutting head for cutting of harder media such as aluminum composite (dibond) or heat sensitive media (FOME-COR). For example, foam core materials have a hard outer surface and soft inner core. The router spindle for such material preferably has sufficient length to penetrate and cut the hard outer layer of the material and has a profile that allows it to inscribe a 45° or other angle to cut a groove in the softer inner core and allow the material to fold at a 90° angle or other angle as preferred. The spindle can use the laser air extraction and precision height setting of the carriage lift system (<0.005").

Figure 8:
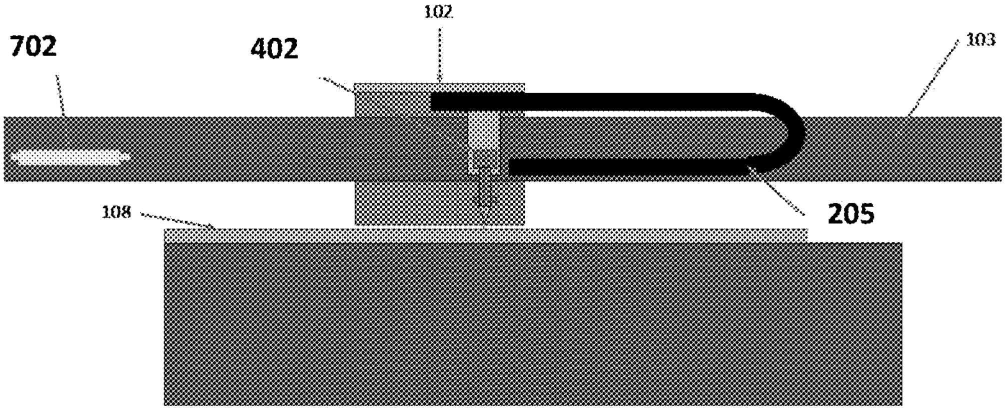
FIG. 8 is a rear view of a printer that shows a CO2 laser-on beam according to an embodiment of the invention.

FIG. 8 is a rear view of a printer that shows a CO2 laser-on beam according to an embodiment of the invention. In FIG. 8, a CO2 laser tube 702 sends a beam to a mirror and lens assembly 402 where the beam is focused onto a substrate to be cut.

Figure 9:
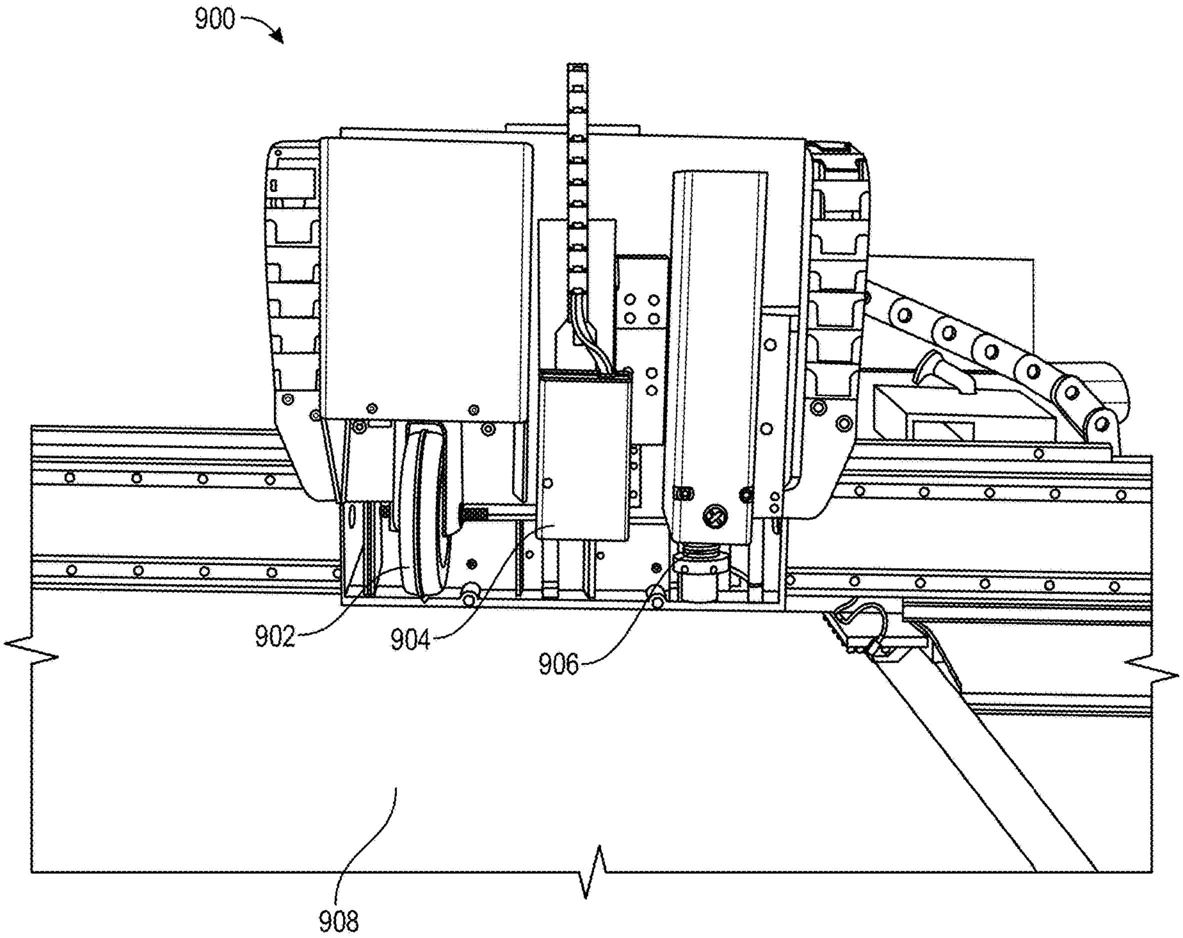
FIG. 9 is a side view of a conventional printer that shows tools for integrated creasing and cutting.

FIG. 9 is a side view of a conventional printer that shows tools for integrated creasing and cutting. In FIG. 9, the head assembly 900 includes a creasing wheel 902. The printer of FIG. 9 is a conventional dedicated (Kongsberg) cutter/creasing machine. An alignment camera 904 is required to re-register the printed media for cutting. The herein disclosed invention eliminates this step. A knife blade 906 is used to cut the medium. This knife arrangement requires that the surface 908 of the table is a cutting mat. the herein disclosed invention with laser does not require a cutting mat.

Figure 10:
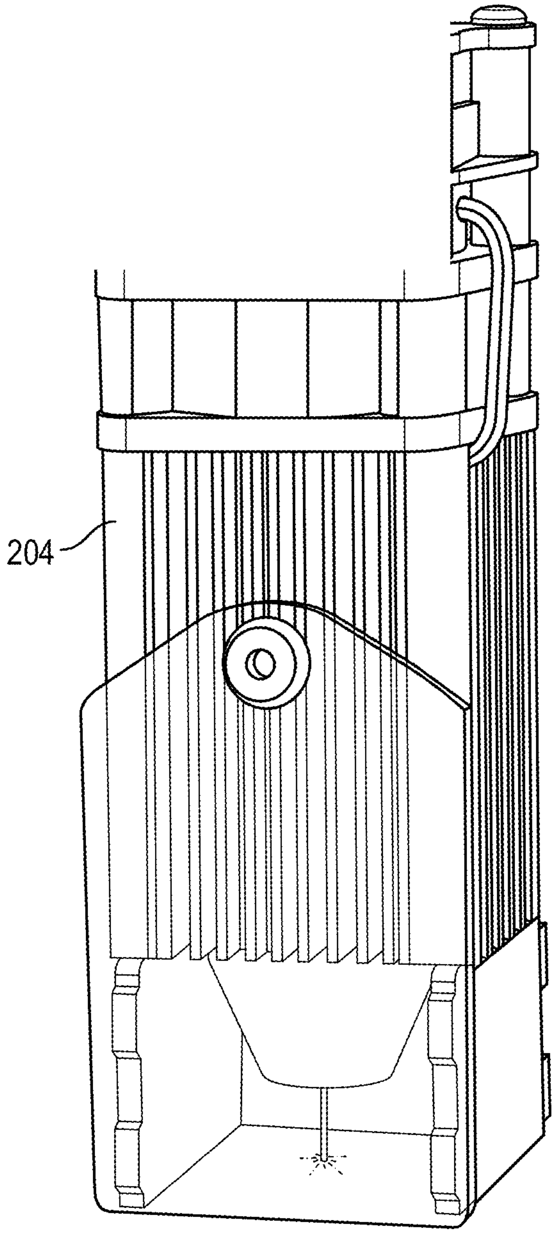
FIG. 10 is a detailed view of a tool for cutting according to an embodiment of the invention.

FIG. 10 is a detailed view of a tool 204 for cutting according to an alternative embodiment of the invention.

Figure 11A:
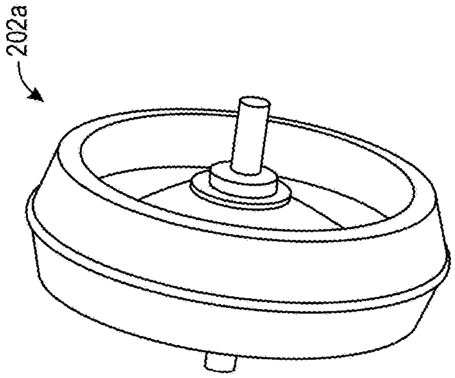
FIGS. 11A-11D provide a detailed view of various tools for creasing according to an embodiment of the invention.
Figure 11B:
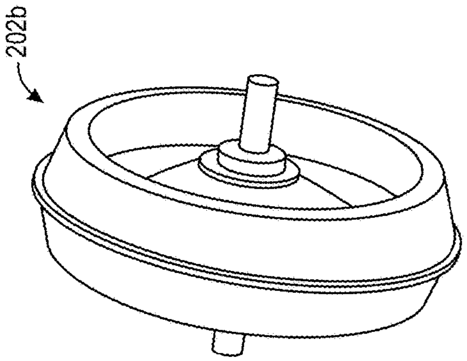
Figure 11C:
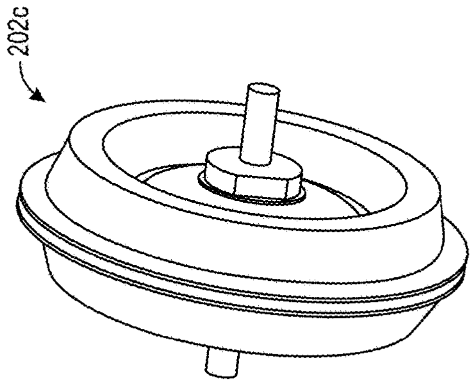
Figure 11D:
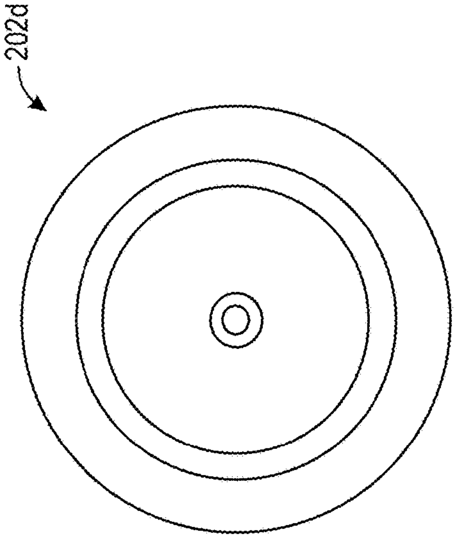

FIGS. 11A-11D provide a detailed view of various tools for creasing according to an embodiment of the invention, e.g. end views are provided showing a thin crease line 202*a* (FIG. 11A), a thick crease line 202*b* (FIG. 11B), and a double crease line 202*c* (FIG. 9C); a side profile view of a typical crease wheel 202*d* is shown in FIG. 11D. Those skilled in the art will appreciate that any desired crease line may be provided.

In embodiments, the creasing wheel is pneumatic but could also be solenoid driven (electronic). The creasing wheel rotates with respect to carriage such that it is always pointed in the direction of travel (angled if X & Y axis move is synchronization). In embodiments of the invention, the creasing wheel is removable and can be exchanged for various sizes/profiles. The creasing wheel may be also replaced by a knife or other bladed instrument. The gantry/carriage speed is adjustable (ips) and crease pressure is adjustable (psi).

Figure 12:
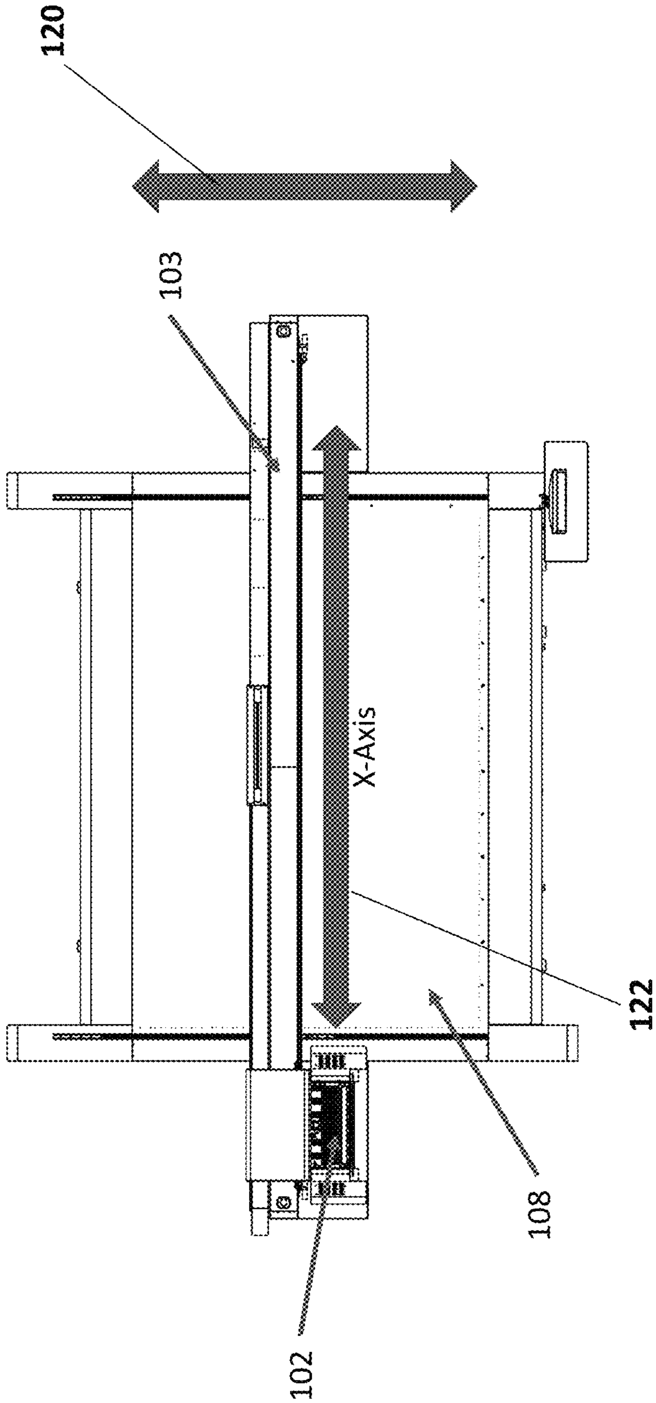
FIG. 12 is a top view of a printer showing X-Y carriage and gantry motion vectors according to an embodiment of the invention.
Figure 13:
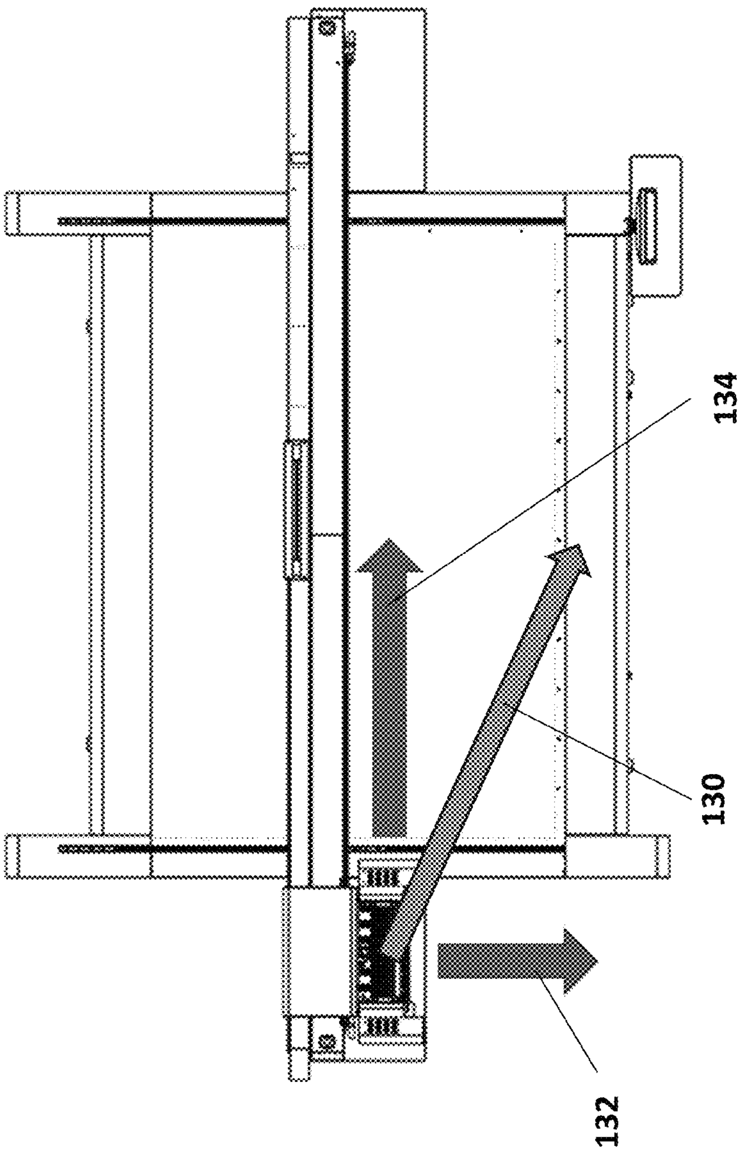
FIG. 13 is a top view of a printer showing angular carriage and gantry motion vectors according to an embodiment of the invention.

FIG. 12 is a top view of a printer showing X-Y carriage and gantry motion vectors according to an embodiment of the invention; and FIG. 13 is a top view of a printer showing angular carriage and gantry motion vectors according to an embodiment of the invention. In FIG. 12 a flatbed printer is shown having two axes of motion that work together as a Cartesian or XY print bed 108. The axes of motion comprise an X-axis 122 in which the carriage 102 moves on the gantry 103 and a Y-axis 120 in which the gantry moves. The carriage can be positioned at any location over the print bed.

As shown in FIG. 13, by moving both axes at the same time, that is as a result of coordinated gantry motion 133 and carriage motion 134, the carriage can be moved at an angle 130. This is typically not used during printing, but the table remains capable of doing so. By moving the two axis at different speeds (or directions) any angle can be achieved.

To roll, the creasing wheel must face the angle of travel. This can be accomplished by putting the wheel on a caster, which uses the force of motion to align the wheel and follow the carriage motion. This makes the start of the crease less predictable. In an embodiment of the invention, a motor (see FIGS. 14A and 14B) is used to rotate the wheel to match the direction of travel prior to extending it down onto the media.

Figure 14A:
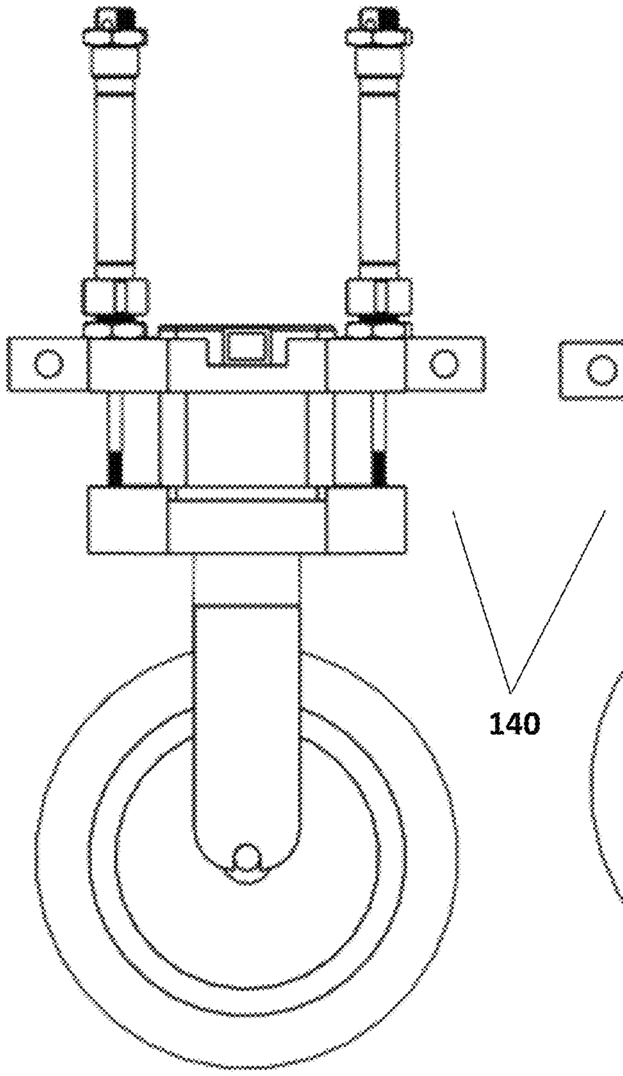
FIGS. 14A and 14B show a creasing module mounted to a printer carriage according to an embodiment of the invention.
Figure 14B:
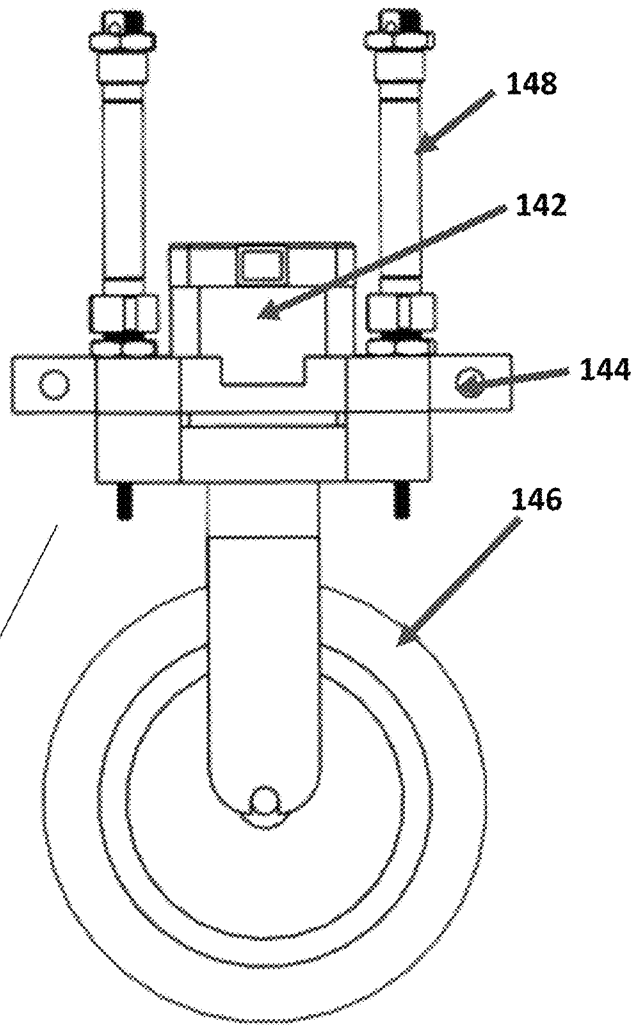

FIGS. 14A and 14B show a creasing module 140 mounted 144 to a printer carriage according to an embodiment of the invention. In an embodiment of the creasing module is pneumatically driven. In other embodiments the creasing module may be operated via a spring or electric solenoid. FIG. 14A shows the creasing module in an extended position; FIG. 14B shows the creasing module in a retracted position. Air pressure supplied to one or more pneumatic cylinders 148 holds the creasing wheel 146 up, off of the medium. This pressure is reversed and used to extend the creasing wheel down into the media. The pressure is adjustable to allow for different medias and creasing wheel profiles. The system provides instructions embedded in production workflow software along with print imaging data to extend and retract the creasing wheel, as well as to set creasing wheel pressure. In embodiments of the invention a motor 142 is provided to effect rotation of the creasing wheel in response to position instructions received from the printer control system.

The printer carriage in the exemplary printer is moderately heavy, e.g. the 100-pound range. The gantry beam and lift system support the creasing wheel and, in embodiments, can repeatably position it to an accuracy of 0.001". This robustness can easily accommodate the force of applying the creasing wheel (approx. 10 lbs) to the medium. Unlike the laser, the size of the creasing module typically requires that it be mounted outside the carriage (that and it is an optional component) past the head assembly 104 and UV cure lamps and laser within the side covers of the laser 106. This requires a subframe that is sufficiently strong to pass the weight and forces back to the main carriage plates.

Figure 15:
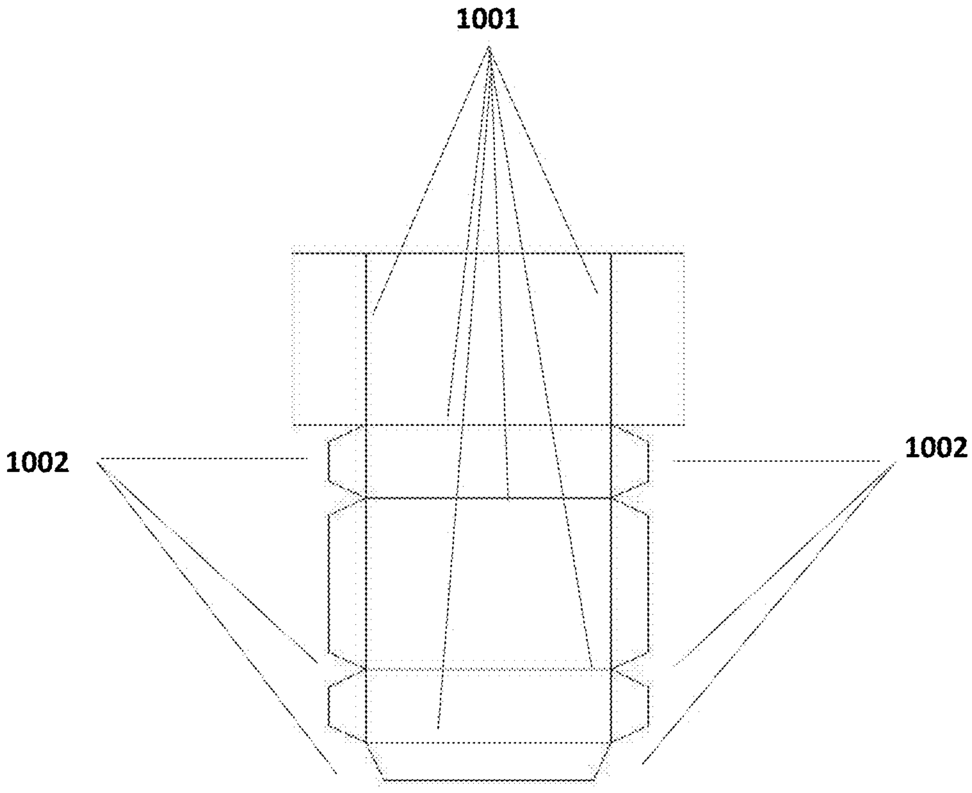
FIG. 15 is a plan view of a medium that has been processed using the herein disclosed flatbed printer with integrated creasing and cutting.

FIG. 15 is a plan view of a medium that has been processed using the herein disclosed flatbed printer with integrated creasing and cutting. In FIG. 15, various creases 1001 and cuts 1002 shown were made by the printer as the medium was printed.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A flatbed printer, comprising:
a print bed;
a gantry configured to traverse the print bed from front-to-back;
a carriage affixed to the gantry and configured to traverse the print bed from side-to-side; and
a print head affixed to said carriage comprising:
at least one ink jet;
a cutting device; and
a creasing device;
wherein said gantry and carriage effect coordinated movement of said print head with respect to a medium registered to said print bed and sequential operation of said at least one ink jet, said cutting device, and said creasing device to print an image on said medium, cut a pattern in said medium, and crease said medium while said medium is stationary on said print bed; and
wherein cutting speed and/or pressure and/or creasing speed and/or pressure are selectably variable.

2. The flatbed printer of claim 1, further comprising:
one or more pins positioned on the print bed to effect registration of the medium to the head assembly for accurate printing, cutting, and creasing.

3. The flatbed printer of claim 1, further comprising:
an alignment bar positioned at one or more edges of the print bed to effect registration of the medium to the head assembly for accurate printing, cutting, and creasing.

4. The flatbed printer of claim 1, further comprising:
an imaging system configured to capture a location of the medium on the print bed and adjust travel of the gantry and carriage to effect registration of the medium to the head assembly for accurate printing, cutting, and creasing.

5. The flatbed printer of claim 1, further comprising:
a vacuum assisted holding mechanism configured to secure the medium to the print bed during printing, cutting, and creasing.

6. The flatbed printer of claim 1, the cutting device further comprising:
any of a laser, a diode laser, a CO2 laser, a CNC style router spindle, and a bladed device.

7. The flatbed printer of claim 6, further comprising:
an exhaust that draws fumes, which result when the laser cuts the medium, away from the printer.

8. A flatbed printer, comprising:
a print bed;
a gantry configured to traverse the print bed from front-to-back;
a carriage affixed to the gantry and configured to traverse the print bed from side-to-side;
a print head affixed to said carriage comprising:
at least one ink jet;
a cutting device; and
a creasing device;
wherein said gantry and carriage effect coordinated movement of said print head with respect to a medium registered to said print bed and sequential operation of said at least one ink jet, said cutting device, and said creasing device to print an image on said medium, cut a pattern in said medium, and crease said medium while said medium is stationary on said print bed; and a user dashboard with which cutting parameters and creasing parameters are set when setting the print parameters.

9. The flatbed printer of claim 1, wherein upon completion of printing the medium, the printer cuts and creases the medium based on instructions embedded in printing information for a current image.

10. The flatbed printer of claim 1, wherein said medium comprises any of:

paper, cardstock, corrugated materials, cardboard, PSA/films, textiles, acrylic, expanded PVC, wood, polystyrene, aluminum composite (dibond), or heat sensitive media (FOME-COR).

11. A flatbed printer, comprising:

a print bed;

a gantry configured to traverse the print bed from front-to-back;

a carriage affixed to the gantry and configured to traverse the print bed from side-to-side; and a print head affixed to said carriage comprising:

at least one ink jet;

a cutting device; and a creasing device;

wherein said gantry and carriage effect coordinated movement of said print head with respect to a medium registered to said print bed and sequential operation of said at least one ink jet, said cutting device, and said creasing device to print an image on said medium, cut a pattern in said medium, and crease said medium while said medium is stationary on said print bed; and wherein coordinated axis motion of the carriage and gantry is effected for cutting of curves and circles.

12. A flatbed printer, comprising:

a print bed;

a gantry configured to traverse the print bed from front-to-back;

a carriage affixed to the gantry and configured to traverse the print bed from side-to-side; and a print head affixed to said carriage comprising:

at least one ink jet;

a cutting device; and a creasing device;

wherein said gantry and carriage effect coordinated movement of said print head with respect to a medium registered to said print bed and sequential operation of said at least one ink jet, said cutting device, and said creasing device to print an image on said medium, cut a pattern in said medium, and crease said medium while said medium is stationary on said print bed; and wherein cutting device power output is adjustable.

13. The flatbed printer of claim 12, wherein a cutting device power adjustment signal is provided to the printer with imaging, cutting, and creasing instructions.

14. The flatbed printer of claim 1, said cutting device further comprising:

a flame detector for verification that a flame is not present after the cutting device is stopped.

15. A flatbed printer, comprising:

a print bed;

a gantry configured to traverse the print bed from front-to-back;

a carriage affixed to the gantry and configured to traverse the print bed from side-to-side; and a print head affixed to said carriage comprising:

at least one ink jet;

a cutting device; and a creasing device;

wherein said gantry and carriage effect coordinated movement of said print head with respect to a medium registered to said print bed and sequential operation of said at least one ink jet, said cutting device, and said creasing device to print an image on said medium, cut a pattern in said medium, and crease said medium while said medium is stationary on said print bed; and wherein said printer is configurable to temporarily receive any of a plurality of creasing devices.

16. The flatbed printer of claim 15, said creasing device configured for creating any of:

a thin crease line, a thick crease line, and a double crease line.

17. The flatbed printer of claim 1, wherein said creasing device is any of pneumatically and electrically operated.

18. A flatbed printer, comprising:

a print bed;

a gantry configured to traverse the print bed from front-to-back;

a carriage affixed to the gantry and configured to traverse the print bed from side-to-side; and a print head affixed to said carriage comprising:

at least one ink jet;

a cutting device; and a creasing device;

wherein said gantry and carriage effect coordinated movement of said print head with respect to a medium registered to said print bed and sequential operation of said at least one ink jet, said cutting device, and said creasing device to print an image on said medium, cut a pattern in said medium, and crease said medium while said medium is stationary on said print bed; and wherein said creasing device is rotatably operable to maintain alignment with a direction of travel of said gantry and said carriage.

19. A flatbed printer, comprising:

a print bed;

a gantry configured to traverse the print bed from front-to-back;

a carriage affixed to the gantry and configured to traverse the print bed from side-to-side; and a print head affixed to said carriage comprising:

at least one ink jet;

a cutting device; and a creasing device;

wherein said gantry and carriage effect coordinated movement of said print head with respect to a medium registered to said print bed and sequential operation of said at least one ink jet, said cutting device, and said creasing device to print an image on said medium, cut a pattern in said medium, and crease said medium while said medium is stationary on said print bed; and wherein said creasing device comprises a knife or other bladed instrument.

20. A flatbed printer, comprising:

a print bed;

a gantry configured to traverse the print bed from front-to-back;

a carriage affixed to the gantry and configured to traverse the print bed from side-to-side;

a print head affixed to said carriage comprising:

at least one ink jet; and a cutting device; and a user dashboard with which cutting parameters and creasing parameters are set when setting the print parameters;

wherein said gantry and carriage effect coordinated movement of said print head with respect to a medium registered to said print bed and sequential operation of said at least one ink jet, said cutting device, and a creasing device to print an image on said medium, cut a pattern in said medium, and crease said medium while said medium is stationary on said print bed.

21. A flatbed printer, comprising:

a print bed;

a gantry configured to traverse the print bed from front-to-back;

a carriage affixed to the gantry and configured to traverse the print bed from side-to-side;

a print head affixed to said carriage comprising:

at least one ink jet; and a creasing device; and a user dashboard with which cutting parameters and creasing parameters are set when setting the print parameters;

wherein said gantry and carriage effect coordinated movement of said print head with respect to a medium registered to said print bed and sequential operation of said at least one ink jet, a cutting device, and said creasing device to print an image on said medium, cut a pattern in said medium, and crease said medium while said medium is stationary on said print bed.

22. A method, comprising:

providing a printer comprising:

a print bed;

a gantry;

a carriage affixed to the gantry;

a print head affixed to said carriage comprising:

at least one ink jet;

a cutting device; and a creasing device; and a user dashboard with which cutting parameters and creasing parameters are set when setting the print parameters;

traversing the print bed from front-to-back with the gantry;

traversing the print bed from side-to-side with the carriage;

operating said gantry and carriage to effect coordinated movement of said print head with respect to a medium registered to said print bed;

sequentially operating said at least one ink jet, said cutting device, and said creasing device while said medium is stationary on said print bed;

said at least one ink jet printing an image on said medium;

said cutting device cutting a pattern in said medium; and said creasing device creasing said medium.

* * * * *